(12) United States Patent
Lee et al.

(10) Patent No.: US 7,383,414 B2
(45) Date of Patent: Jun. 3, 2008

(54) METHOD AND APPARATUS FOR MEMORY-MAPPED INPUT/OUTPUT

(75) Inventors: Robert Lee, Sunnyvale, CA (US); Harlan Sexton, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 554 days.

(21) Appl. No.: 10/856,681

(22) Filed: May 28, 2004

(65) Prior Publication Data

US 2005/0268067 A1 Dec. 1, 2005

(51) Int. Cl.
*G06F 12/08* (2006.01)
(52) U.S. Cl. .................. 711/206; 711/203; 711/207; 711/208; 711/220; 711/6
(58) Field of Classification Search ........ 711/202–208, 711/220
See application file for complete search history.

(56) References Cited

U.S. PATENT DOCUMENTS

| 7,107,389 B2 * | 9/2006 | Inagaki et al. ............. 711/103 |
| 2005/0013183 A1 * | 1/2005 | Southwell ................... 365/202 |

OTHER PUBLICATIONS

Rashid, Richard, "Machine-Independent Virtual Memory Management for Paged Uniprocessor and Multiprocessor Architectures," 2nd Symposium on Architectural Support for Programming Languages and Operating Systems, ACM Oct. 1987, pp. 1-14.

The Open Group, "The Single Unix Specification, Version 2—mmap-map pages of memory," 1997, retrieved from the internet at <http://www.opengroup.org/onlinepubs/007908799/xsh/mmap.html>, retrieved on Nov. 7, 2005, 5 pages.

* cited by examiner

*Primary Examiner*—Matthew Kim
*Assistant Examiner*—Hetul Patel
(74) *Attorney, Agent, or Firm*—Hickman Palermo Truong & Becker LLP

(57) ABSTRACT

A method of managing memory mapped input/output (I/O) for a run-time environment is disclosed, in which opaque references are used for accessing information blocks included in files used in a dynamic run-time environment. The information block is stored in a shared memory space of pages that are each aligned on respective boundaries having addresses that are each some multiple of two raised to an integer power. The opaque reference used for the dynamic run-time environment includes at least an index, or page number reference into a page map of references to the pages of the shared memory space, and an offset value indicating an offset into the referenced page for the beginning of the storage of the information block. Control bits of the opaque reference indicate information such as the mapping mode, e.g., read-only, read-write, or private. Pages which are modified by a process may be written back to a backing store of the file based on control bits which indicate that a page has been modified.

27 Claims, 6 Drawing Sheets

METHOD AND APPARATUS FOR MEMORY-MAPPED INPUT/OUTPUT

FIELD OF THE INVENTION

The present invention relates to memory management and more particularly to a method and apparatus for managing memory mapped input/output (I/O) for a run-time environment.

BACKGROUND OF THE INVENTION

A dynamic run-time environment for a language such as JAVA™ is responsible for managing memory used during execution of a program to store information. References are used by a run-time environment to identify and ultimately access regions of memory. For main memory in the address space of an executing program, these references are typically encoded using machine pointers. Since machine pointers are closely coupled to the underlying hardware and firmware of a computer system, machine pointers provide a fast means of accessing files and, hence, are a popular implementation for references. However, security may be jeopardized by exposing actual machine addresses of local data areas to the dynamic run-time environment for a language such as JAVA.

Many platforms have system library support for memory-mapped I/O, such as the UNIX function map( ), which establishes a mapping between the address space of a process and information stored in a file outside of the address space of the process (e.g. on disk or in another kind of secondary storage device). Successful use of the map( ) function provides an pointer containing a memory address to a region of main memory that corresponds to the mapped portion of the file. Memory-mapped I/O allows access to resources via address space manipulations, instead of through read and write operations, which reduces the processing time overhead compared to read and write access to a file. For example, a file on disk can be manipulated by memory mapping the file into virtual memory, modifying data in the region of the address space that has been mapped for the file via machine pointers, and storing the modified data back into secondary storage.

Differences between server environments make machine independence very difficult to achieve for portable run-time environments. For example, some operating systems, in practice if not by design, limit the guaranteed size of contiguous main memory to a "page," typically about two or four kilobytes in size, and prior paged memory systems simply failed when sufficient large blocks of virtual memory were not available. This page-size limitation may occur, for example, on computer systems that permit shared memory for access by different processes and even by different processors.

Another problem is that for safety reasons, some run-time environments do not permit applications to manipulated raw pointers directly. One example is a run-time environment for implementing JAVA™, an platform-independent, object-oriented language originally developed by Sun Microsystems, Inc. In JAVA, attributes and methods for a class of objects are typically defined in a source file, which is compiled into an architecture-neutral object file containing bytecodes that are interpreted in a virtual machine at the target platform. Because Java does not allow direct manipulation of memory for safety reasons, memory manipulations go through a call interface that dispatches to system native methods to perform the actual manipulation of main memory.

Therefore, a need exists for an efficient and safe memory-mapped I/O support for paged memory architectures.

SUMMARY OF THE INVENTION

The present invention addresses these and other needs by providing sanitized or opaque references to memory-mapped data, in which the opaque reference directly encode page and offset information for simulating contiguous memory-mapped I/O on a paged memory architecture. The page and offset information encoded into an opaque reference may include an index or page number reference into a page map of pointers to memory pages, as well as an offset value indicating an offset into the referenced page for locating a block of data. In one embodiment, control bits can also be embedded in the opaque pointer to indicate such information as the mapping mode (e.g., read-only, read-write, private, etc.). Because of the page-offset information encoded in the opaque reference, determining whether a request to access or manipulate memory-mapped data involves multiple pages is done by adding the length of the request to the opaque reference and checking if the page information in the result is different.

Accordingly, one aspect of the invention relates to a computer-implemented method and a computer-readable medium bearing instructions for reading a block of data at a location in a memory-mapped file. The methodology uses a reference that indicates the location of the block of data in the memory-mapped file. A page number and a page offset is extracted from bits of the reference, from which a virtual memory address is computed based on the page number and the page offset. The block of data is then read from the shared memory address.

Another aspect of the invention involves a computer-implemented method and a computer-readable medium bearing instructions for writing a number of bytes to a location in a memory-mapped file. A reference indicating the location in the memory-mapped file is received, from respective portions of which a page number and a page offset is extracted. A memory address is computed based on the page number and the page offset and the block of data is stored based on the memory address.

Yet another aspect of the invention pertains to a computer-implemented method and a computer-readable medium bearing instructions for memory-mapping a file. The methodology includes determining an available page in a virtual memory space for storing at least a portion of the file; computing a virtual page reference to the available page based on a memory address of the available page and control information associated with the available page; storing the virtual page reference in a page map; storing the at least a portion of the file in the available page; and computing an opaque reference to the available page indicating a page map index for the location of the virtual page reference and an offset value.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for managing memory mapped input/output (I/O) are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Systems that implement the present invention are not limited to any particular type of data storage or storage architecture. However, for the purpose of explanation, the terminology and examples used herein shall be that typically associated with systems that support relational databases.

Hardware Overview

Figure 1:
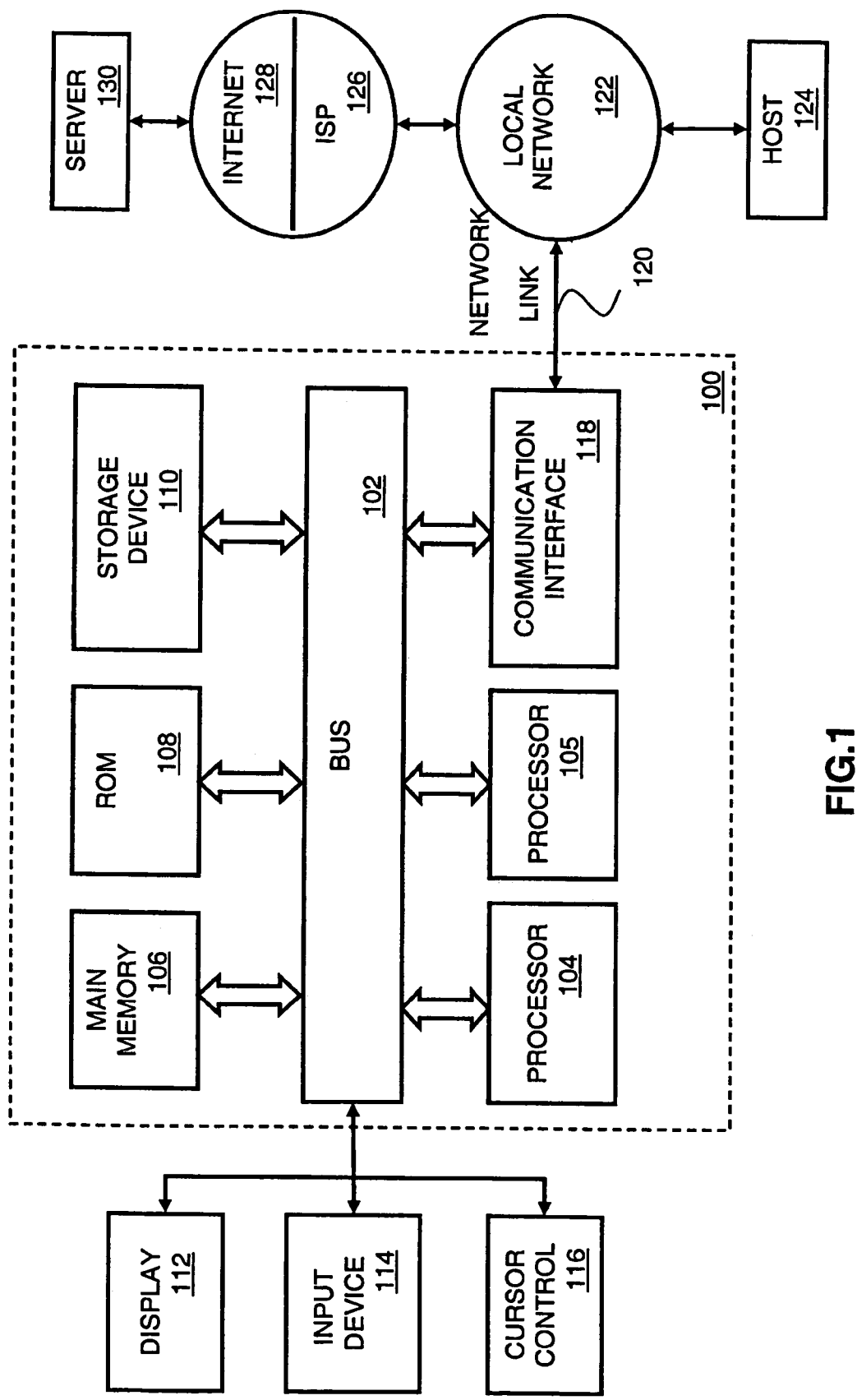
FIG. 1 depicts a computer system that can be used to implement an embodiment of the present invention.

FIG. 1 illustrates a computer system 100 upon which an embodiment according to the present invention can be implemented. The computer system 100 includes a bus 102 or other communication mechanism for communicating information, and a processor 104 coupled to the bus 102 for processing information. The computer system 100 also includes main memory 106, such as a random access memory (RAM) or other dynamic storage device, coupled to the bus 102 for storing information and instructions to be executed by the processor 104. Main memory 106 can also be used for storing temporary variables or other intermediate information during execution of instructions to be executed by the processor 104. The computer system 100 further includes a read only memory (ROM) 108 or other static storage device coupled to the bus 102 for storing static information and instructions for the processor 104. A storage device 110, such as a magnetic disk or optical disk, is additionally coupled to the bus 102 for storing information and instructions.

The computer system 100 may be coupled via the bus 102 to a display 112, such as a cathode ray tube (CRT), liquid crystal display, active matrix display, or plasma display, for displaying information to a computer user. An input device 114, such as a keyboard including alphanumeric and other keys, is coupled to the bus 102 for communicating information and command selections to the processor 104. Another type of user input device is cursor control 116, such as a mouse, a trackball, or cursor direction keys for communicating direction information and command selections to the processor 104 and for controlling cursor movement on the display 112.

According to one embodiment of the invention, memory mapped I/O is provided by the computer system 100 in response to the processor 104 executing an arrangement of instructions contained in main memory 106. Such instructions can be read into main memory 106 from another computer-readable medium, such as the storage device 110. Execution of the arrangement of instructions contained in main memory 106 causes the processor 104 to perform the process steps described herein. One or more processors 104, 105 in a multi-processing arrangement may also be employed to execute the instructions contained in main memory 106. In alternative embodiments, hard-wired circuitry may be used in place of or in combination with software instructions to implement embodiments of the present invention. Thus, embodiments of the present invention are not limited to any specific combination of hardware circuitry and software.

The computer system 100 also includes a communication interface 118 coupled to bus 102. The communication interface 118 provides a two-way data communication coupling to a network link 120 connected to a local network 122. For example, the communication interface 118 may be a digital subscriber line (DSL) card or modem, an integrated services digital network (ISDN) card, a cable modem, or a telephone modem to provide a data communication connection to a corresponding type of telephone line. As another example, communication interface 118 may be a local area network (LAN) card (e.g. for Ethernet™ or an Asynchronous Transfer Model (ATM) network) to provide a data communication connection to a compatible LAN. Wireless links can also be implemented. In any such implementation, communication interface 118 sends and receives electrical, electromagnetic, or optical signals that carry digital data streams representing various types of information. Further, the communication interface 118 can include peripheral interface devices, such as a Universal Serial Bus (USB) interface, a PCMCIA (Personal Computer Memory Card International Association) interface, etc.

The network link 120 typically provides data communication through one or more networks to other data devices. For example, the network link 120 may provide a connection through local network 122 to a host computer 124, which has connectivity to a network 128 (e.g. a wide area network (WAN) or the global packet data communication network now commonly referred to as the "Internet") or to data equipment operated by a service provider 126. The local network 122 and network 128 both use electrical, electromagnetic, or optical signals to convey information and instructions. The signals through the various networks and the signals on network link 120 and through communication interface 118, which communicate digital data with computer system 100, are exemplary forms of carrier waves bearing the information and instructions.

The computer system 100 can send messages and receive data, including program code, through the network(s), network link 120, and communication interface 118. In the Internet example, a server 130 might transmit requested code belonging to an application program for implementing an embodiment of the present invention through the network 128, local network 122 and communication interface 118. The processor 104 may execute the transmitted code while being received and/or store the code in storage device 110, or other non-volatile storage for later execution. In this manner, computer system 100 may obtain application code in the form of a carrier wave.

The term "computer-readable medium" as used herein refers to any medium that participates in providing instructions to the processor 104 for execution. Such a medium may take many forms, including but not limited to computer-readable storage medium and transmission media. Computer-readable storage medium include non-volatile media, for example, optical or magnetic disks, such as storage device 110; and volatile media, for example, include dynamic memory, such as main memory 106. Transmission media include coaxial cables, copper wire and fiber optics, including the wires that comprise bus 102. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on a storage device either before or after execution by processor.

Memory Model

One embodiment of the present invention is illustrated with respect to a memory model that is implemented for a multi-user run-time environment. Accordingly, a detailed description of the memory model for this working example is provided, but the present invention is not limited to this example nor to the use of this memory model.

Figure 2:
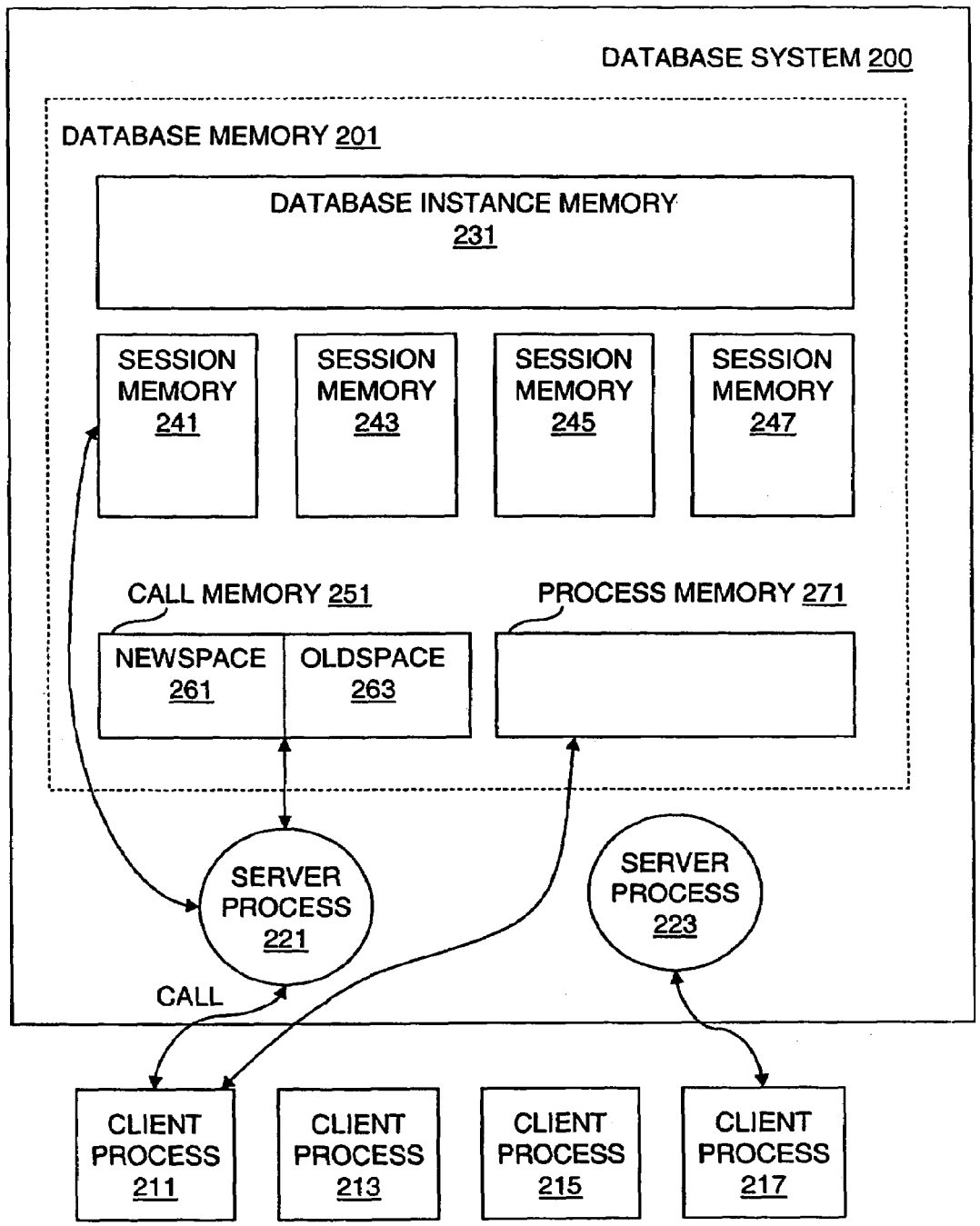
FIG. 2 shows an exemplary memory model for use in accordance with one embodiment of the present invention.

FIG. 2 schematically illustrates a multi-user database system 200 with which a run-time environment for a language such as the JAVA™ programming language may be used, although the present invention is not limited to multi-user database systems in particular and may be applied to other multi-user systems. In the illustrated configuration, client processes 211, 213, 215, and 217 establish database sessions with the database system 200. A database session refers to the establishment of a connection between a client and a database system through which a series of calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a JAVA™ programming language object or class, defined for performing a database task for database system 200.

Database system 200 comprises, among other components, a database memory 201 for storing information useful for processing calls and a number of server processes 221 and 223 for handling individual calls. The database memory 201 includes various memory areas used to store data used by server processes 221 and 223. These memory areas include a database instance memory 231, session memories 241, 243, 245, and 247, call memory 251, and a process memory 271. It is to be understood that the number of the session memories, call memories, and process memories in FIG. 2 is merely illustrative and, in fact, the number of such memories will vary over time as various clients make various calls to the database system 200.

The database instance memory 231 is a shared memory area for storing data that is shared concurrently by more than one process. For example, a shared memory area may be used to store the read-only data and instructions (e.g., bytecodes of JAVA™ programming language classes) that are executed by the server processes 221 and 223. The database instance memory 231 is typically allocated and initialized at boot time of the database system 200, before clients connect to the database system 200.

When a database session is created, an area of the database memory 201 is allocated to store information for the database session. As illustrated in FIG. 2, session memories 241, 243, 245, and 247 have been allocated for clients 211, 213, 215, and 217, respectively, for each of which a separate database session has been created. Session memories 241, 243, 245, and 247 are a shared memory used to store static data, i.e., data associated with a user that is preserved for the duration of a series of calls, especially between calls issued by a client during a single database session. JAVA™ programming language static class variables are one example of such static data.

A call memory, such as call memory 251, is used to store data that is bounded by the lifetime of a call. A database call may include execution of a query or other kinds of Structured Query Language (SQL) statements or a group of such statements within a database transaction. When client 211 submits a call to the database system 200, one of server processes 221 or 223 is assigned to process the call. For the duration of the call, the server process is allocated a call memory for storing data and other information for use in processing the call. For example, server process 221 uses call memory 251 and session memory 241 for processing a call submitted by client process 211.

At any given time, a server process (e.g., processes 221, 223) is assigned to process a call submitted by a single client (e.g., clients 211, 213, 215, 217). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much smaller than the current number of active clients. Thus, database system 200 is typically configured to execute fewer server processes than the maximum number of active clients.

Process memory 271 is an area of memory that has the duration of a process and can be used to hold the virtual machine state of the process that is not user-specific. In one embodiment, use of the process memory 271 can be selectively available for specific processes. For example, process memory 271 may be available only for those processes that are started in a specific way, and sessions may be attached to such processes only if they are intended to run the specific applications (e.g. an application server) that make use of the process memory 271 feature.

Objects are entities that encapsulate data and, in some environments, operations and methods associated with the object. When an object is created, memory is allocated for the object, and when the object is no longer needed, that memory for the object is deallocated so that the memory can be reused for other purposes. In dynamic run-time environments, objects are allocated and deallocated throughout the life of program, and the memory management of such dynamic objects is crucial to the correctness and performance of dynamic run-time environments.

"Virtual memory" refers to memory addressable by a storage allocation technique in which auxiliary storage, such as memory in a secondary storage device, can be addressed as though it were part of a main memory. More specifically, combinations of hardware, firmware, and operating systems cooperate to automatically swap portions of the code and data for an executing process on an as-needed basis. Thus, a virtual address space may be regarded as addressable main memory to a process executing on a computer system that maps virtual addresses into real addresses. The size of the virtual address space is usually limited by the size of a native machine pointer, but not by the actual number of storage elements in main memory.

A "memory-mapped file" is a file which is utilized by a process and for which at least portions of the file which are requested or used by the process are copied into a virtual memory space for accessibility by the process, and for which virtual memory portions of the file which are modified by the process may be written back to a backing store for the file (e.g., in secondary storage).

On many operating systems, a process will utilize a certain amount of virtual memory that no other user process may access in order to provide data security. "Shared memory" refers to the virtual or physical address space on a computer system that is concurrently accessible to a plurality of executing user processes on a processor. In some embodiments, shared memory is also accessible to executing user processes on a plurality of processors.

"Secondary storage" as used herein refers to storage elements, other than virtual memory, accessible to a process. Secondary storage may be local or networked. Local secondary storage, furnished by storage device 110 on computer system 100, is preferably a random access storage device such as a magnetic or optical disk. Networked secondary storage is provided by storage devices on other computer systems, for example on the host 124 accessible over local area network 122 or on a server accessible over wide area network 128 such as the Internet.

On some operating systems, objects or files can be discontiguous. These operating systems, in practice if not by design, limit the guaranteed size of contiguous virtual memory to a "page." A page is a moderately sized contiguous memory segment that is supported within the server environments, especially for shared memory. For example, the page size may be in the range of 256 B ($2^8$ bytes) to 64 kB ($2^{16}$ bytes), such as 4 kB ($2^{12}$ bytes) or 8 kB ($2^{13}$ bytes). For purposes of illustration, the following discussion will refer to 4 kB pages in an exemplary embodiment, in which the pages themselves are aligned on 4 kB boundaries. This page-size limitation may occur, for example, on computer systems that permit files to be allocated in a shared memory for access by different processes and even by different processors. If a file is larger than a page or if the file is larger than the available memory on a page, then one part of the file would have to be allocated on one page and another part of the file would have to be allocated on another page.

Conceptual Overview

Figure 3:
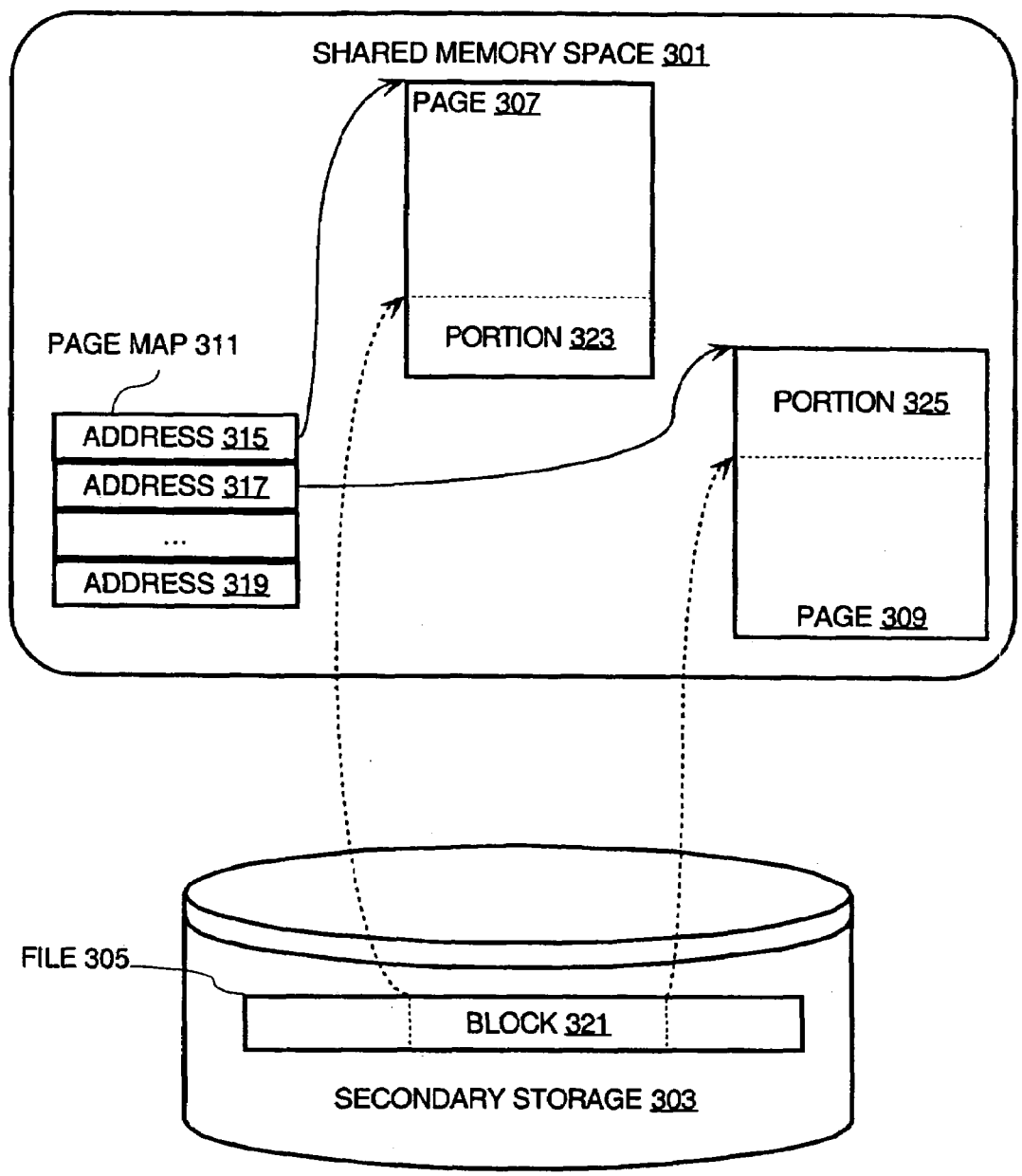
FIG. 3 is a block diagram of a memory-mapped file in accordance with one embodiment of the present invention.

FIG. 3 is a high-level block diagram of a configuration used in one exemplary embodiment of the present invention comprising a shared memory space 301 and a secondary storage 303, which may be a hard disk or computer-readable medium. The secondary storage 303 includes a file 305 or other collection of related records or data items that are treated as a unit.

The shared memory space 301 may includes a number of pages 307 and 309, which need not be guaranteed to be contiguous beyond a predetermined size such as 4 kB. For this example, pages 307 and 309 are each aligned on respective boundaries having addresses that are each some multiple of two raised to an integer power (e.g., $N \times 2^{12}$) that is predetermined typically by hardware or software constraints. The size of each page 307 and 309 is typically equal to two raised to the integer power (e.g., $2^{12}$). Furthermore, in this example, pages 307 and 309 are discontiguous with one another: they do not share a common boundary. Thus, the discontiguous pages 307 and 309 of the shared memory space 301 are used for simulating a contiguous memory mapped input/output (I/O) in a dynamic environment such as an application using a JAVA™ Virtual Machine (JVM).

To keep track of the pages used for simulating memory-mapped I/O, a page map 311 is maintained through which the various pages 307 and 309 of the shared memory space 301 may be accessed. Each page is assigned a logical page number, which is used to index the page map 311 to fetch the memory address of the beginning of the page, referred to as a page address. For example, the page map 311 contains entries 315, 317, and 319 storing page addresses of the pages of the shared memory space 301. The logical order of the pages in the page map 311 may be different from the physical order of the pages in the shared memory space 301. While the page map 311 is depicted as an array, the page map 311 may be implemented by any other type of data structure which may be used to indicate a logical ordering of the pages, such as a linked list. Thus, if logically contiguous data is stored in more than one page, the data stored in the first page containing the data may be accessed for the first portion of data, and the page map 311 may be used to obtain the address of the second page containing a second portion of the data, etc., so that even though the data may be stored in discontiguous pages, the page map 311 enables access to the data for processing as logically contiguous data.

Accordingly, the page map 311 is used to store at least the memory addresses 315 and 317 of the pages 307 and 309 of the shared memory space 301, respectively. Using data structure concepts of arrays, each entry in the page map 311 may be viewed as being referenced using an index into the page map 311 (e.g., entries referenced as page_map[0], page_map[1], . . . , page_map[n]), where each entry is arranged contiguous and adjacent to any preceding and/or next entry. This arrangement conveniently enables files such as file 305 to be mapped to pages 307 and 309 in the shared memory space 301, starting with the page address 315 stored in the page map 311 corresponding to page 307. If the file 315 has a size that is larger than a size of page 307, portions of the file are stored in more than one page, for example, on page 309. Thus, the shared memory address for pages 307 and 309 are not physically contiguous, but the storage for the file 305 is logically contiguous.

The references to the two pages 307 and 309, which include the page addresses 315 and 317, however, are stored contiguously in the page map 311. Thus, the references to the physically discontiguously mapped portions onto pages 317 and 309, respectively, of the file 305 are stored physically contiguously in the page map 311.

This arrangement conveniently enables various items to be stored within files included in the pages 307 and 309, and to be retrieved using a "page address plus offset" form of addressing for storing and accessing the various items. Thus, each of the various items stored in the shared memory space 301 may at least have a starting address that may be calculated as the sum of an address of some page 307 and 309 added to an offset into the page 307 and 309, respectively. If an item is small enough to fit in the storage available within the page 307 and 309, starting at the item's offset, then the item may be accessed by referencing only one page 307 and 309. However, if a block of data 321 in file 305 needs more space than available in a single page 307 or 309, then portions of the block of data 321 may be mapped in portions 323 and 325, respectively, in two or more pages 307 or 309.

Accordingly, block of data 321 is mapped at a location that is a particular number of bytes, or "offset," beyond the beginning address 315 of the page 307. The block of data 321 is used for processing by an application program, and may be quickly accessed by adding the address 315 of the page 307 containing the portion 321, which corresponds to the beginning of the block of data 321, to the offset value which is typically expressed as the number of bytes of offset into the page 307 to obtain the address of the block of data 321. If the block of data 321 has a size that is larger than the remaining space in 307, then portions of the block of data 321 are mapped in more than one discontiguous pages. In the example of FIG. 3, block of data 321 of the file 305 is mapped to a first portion 323 in page 307 and a second portion 325 mapped in page 309. The storage for pages 307 and 309 is not physically contiguous, although the storage for the block of data 321 in the file 305 is logically contiguous.

Opaque Reference to Block of Data

Figure 4:
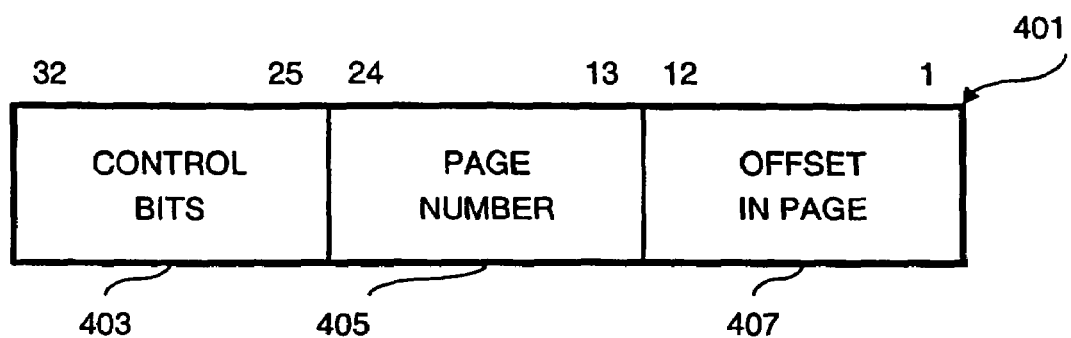
FIG. 4 depicts an exemplary opaque pointer for referencing an information block mapped into a memory space in accordance with one embodiment of the present invention.

Referring to FIG. 4 by way of example, an exemplary structure depicts an opaque reference 401, which may be used to hold data regarding the location of the memory-mapped block of data 321 at portions 323 and 325 in the shared memory space 301. The opaque reference 401 may be passed to and from a dynamic run-time environment such as JAVA, e.g., through a call interface. Since environments such as JAVA need not perform any manipulations on references to memory but use the reference as a handle on data to be manipulated by system native methods for load and store operations, the opaque reference 401 passed need not be an actual memory address. By not passing an actual memory address, security may be enhanced because the opaque reference 401 can only refer to memory under control of the memory-mapped I/O system.

By passing at least an opaque reference 401 and a length value, a block of data 321 mapped in the shared memory space 301 may be accessed by calculating the beginning address 315 of the mapped portion 323 of the mapped block of data 321 and then accessing the data stored at the calculated address for the number of bytes indicated by the length value. If the block of data 321 is mapped across page boundaries in more than one page 307 and 309, then addresses of various portions 323 and 325 of the block of data 321 may be calculated as discussed below.

Bits 1-12 of the exemplary opaque reference 401 are used to store a value for an offset 407 within a page, bits 13-24 to store a value 405 for a page number, and bits 25-32 to store control bits 403, which may be used for various properties such as indicating a mapping mode (e.g., read only, read/write, private) associated with the block of data referenced by the opaque reference 401.

Page Map Reference to Page in Shared Memory Space

Figure 5:
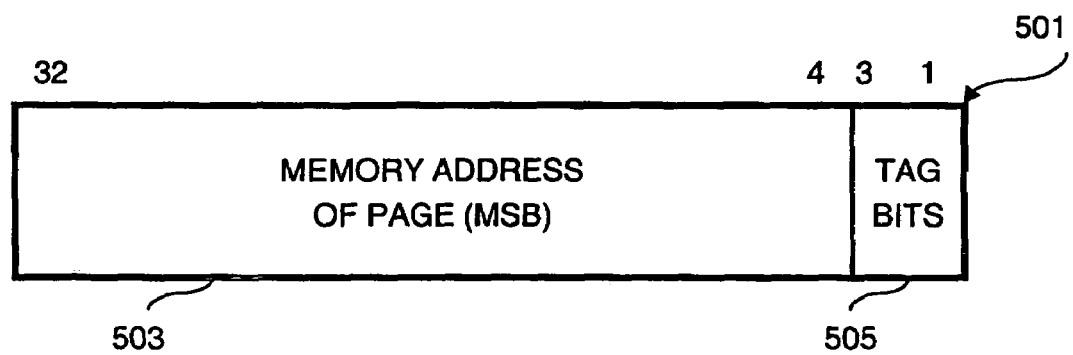
FIG. 5 depicts a page map reference for referencing a file mapped in main memory in accordance with one embodiment of the present invention.

FIG. 5 illustrates an exemplary structure depicting a page map reference 501 which may be stored in a slot of the page map 311 to hold the memory address 315, 317, . . . , 319 of one of the pages 307 and 309 in the shared memory space 301. Bits 1-3 of the exemplary page map reference 501 may be used as tag bits 505 for indicating, e.g., whether the referenced page has been modified and thus needs to be rewritten to the file 305 in secondary storage 303. Bits 4-32 store a memory address of a page 503 that is stored in the shared memory space 301. Since the pages 307 and 309 of the shared memory space 301 are aligned on boundaries that are a multiple of two raised to an integer power (e.g., $2^3$), only the most significant bits of addresses of the pages 307 and 309 are possibly non-zero, and the low-order bits (e.g., bits 1-3) of the memory address will always be zero. Thus, the low-order bits of the page map reference 501 may be used for other purposes such as storing control information, by simply masking out the low-order bits to zero when the memory address of a page 503 is needed. For example, a page map reference 501 having a value of 0x3F3F3F3F is stored in the second slot of the page map 311 (i.e., page map[2]). The memory address of the page 503 is extracted from the page map reference 501 by masking the tag bits 505 of the page map reference 501, resulting in the memory address of the page 503 having a value of 0x3F3F3F38. The tag bits 505 are extracted by masking the bits representing the memory address of the page 503, resulting in the tag bits 505 having a value of 0x7. Thus, the exemplary page map reference 501 may be used to access a page in the shared memory space 301 at memory address 0x3F3F3F38. Furthermore, the tag bits 505 value of 0x7 may be analyzed to determine features or attributes of the referenced page (e.g., whether the page stored in the shared memory space 301 has been modified, and thus may need to be written to the file 305 in secondary storage 303).

Address Calculation Using Opaque Reference

Figure 6:
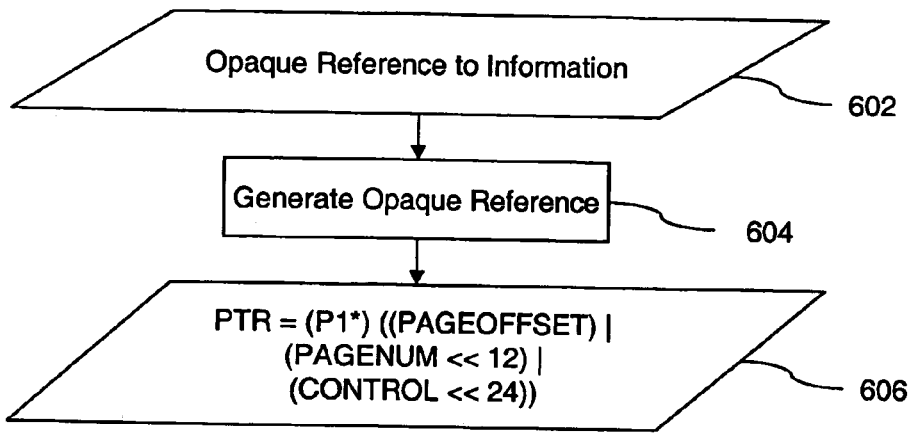
FIG. 6 is a flowchart that illustrates exemplary steps for generating the opaque pointer to the block of data for an embodiment of the present invention.

FIG. 6 illustrates exemplary steps taken to generate an opaque reference 401 to a block of data 321 that is memory-mapped to portions 323 and 325 in the shared memory space 301. At step 602, a request is received for a reference to the memory-mapped block of data 321. The request may be received, e.g., for use with access requests made via the API for the JVM. At step 604, the requested opaque reference 401 is generated. At step 606, the value of the control bits field 403 is shifted left 24 bits to align the field in bits 25-32 of the opaque reference 401. The value of the page number field 405 is shifted left 12 bits to align the field in bits 13-24 of the opaque reference 401. The value of the page number field may be, e.g., the value of the index of the slot in the page map 311 that includes the reference to the page in the shared memory space 301 in which the block of data is stored. The value of the offset within the page 407 is logical ORed with the shifted values of the control bits field 403 and the page number field 405, and the resulting value is type cast to generate a reference which is in a format acceptable to the requestor of the reference. The reference may be cast to any format supported by the requester, e.g., unsigned long type.

Since a requestor such as JAVA need not process the reference as an address to data, the reference is treated by the requestor only as a handle to the memory-mapped block of data 321, and the problem of accessing the storage referenced by the reference is left to the addressing routines via the API. By using the opaque reference format, memory blocks mapped in one database call should be available for use in subsequent calls within the same session. The result of using this reference format is the appearance of a contiguous memory region (e.g., presented to JAVA). Memory load/store routines in the JAVA call interface to write memory addresses will easily detect and handle cases where loads/stores cross page boundaries by computing addresses of the beginning and end of the access, and comparing the associated page numbers of the two addresses.

Figure 7:
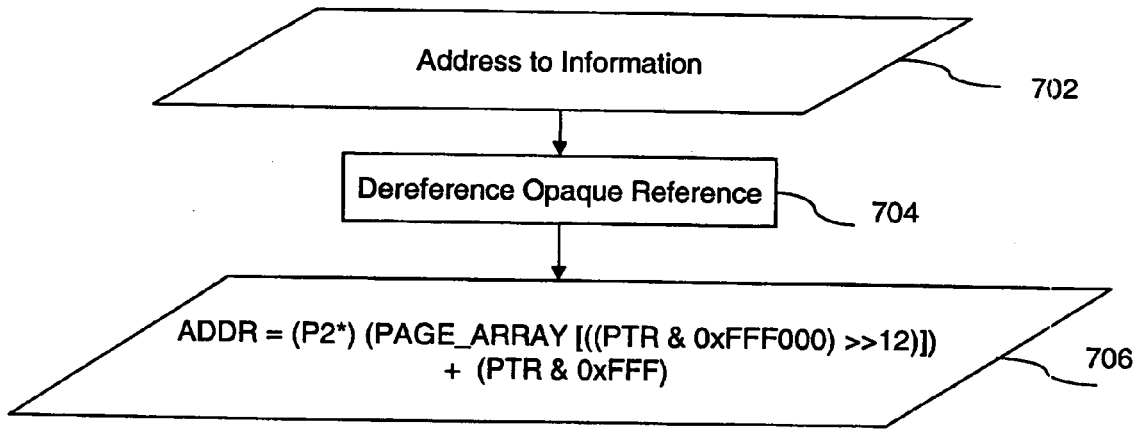
FIG. 7 is a flowchart that illustrates exemplary steps for dereferencing the opaque pointer to the block of data for an embodiment of the present invention.

FIG. 7 illustrates exemplary steps taken to dereference an opaque reference to obtain an address for accessing the memory-mapped block of data 321 within the shared memory space 301. At step 702, a request is received for an access to the memory-mapped block of data 321 via the opaque reference 401. The request may be received, e.g., via the API for the JVM. At step 704, the opaque reference 401 is dereferenced to obtain an address for accessing the location of the memory-mapped block of data 321. At step 706, the opaque reference 401 is masked to obtain the value of the page number 405 by logically ANDing the opaque reference 401 with mask 0xFFF000. The masked value is shifted right 12 bits, and the resulting value is used as an index value into the page map 311 for a reference to a page in the shared memory space 301. The opaque reference 401 is also logically ANDed with 0xFFF to obtain the value of the page offset 407. The address of the page, which is calculated using the reference to the page obtained from the page map 311, and the offset are added together to obtain the address of the portion 323, which may be accessed using the address.

The control bits may be similarly obtained by masking and shifting relevant bits of the opaque reference 401 to separate out the individual bits, or alternatively, the control bits may be recognized as values of various of bit combinations (e.g., a bit combination of '00000110'B may be recognized as a decimal value of 6).

Figure 8:
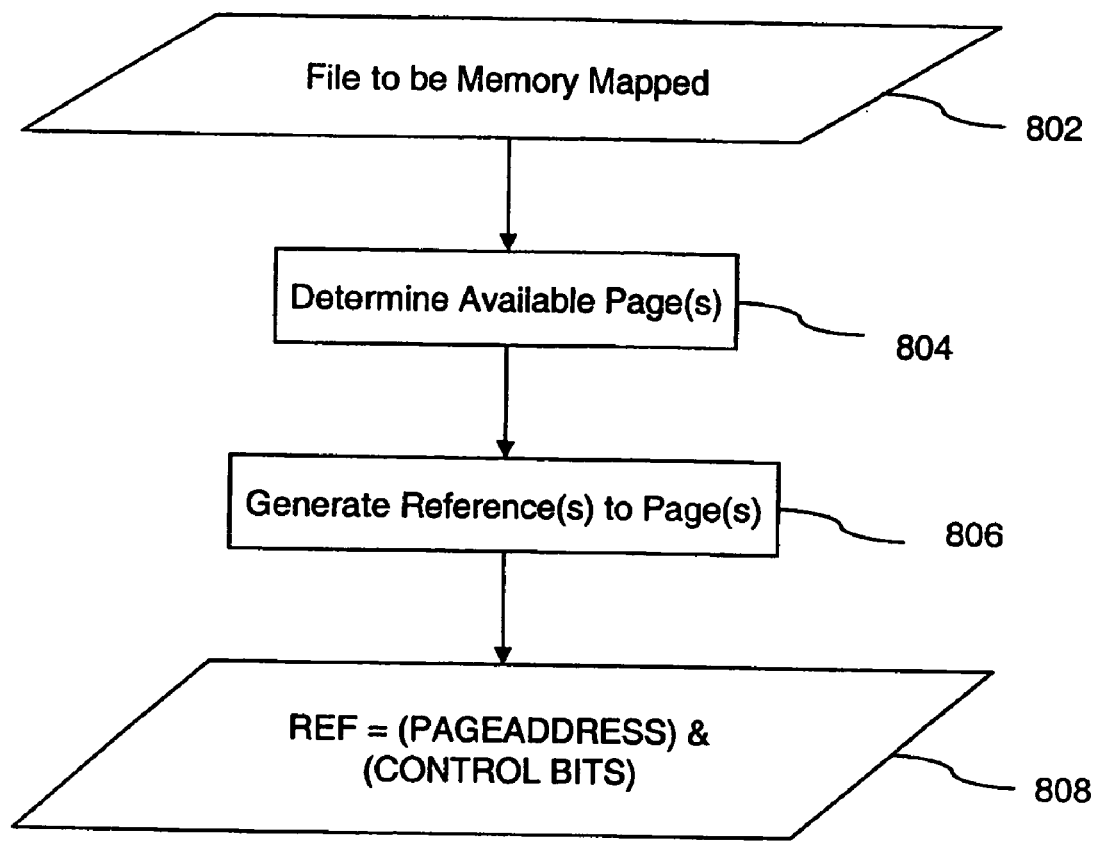
FIG. 8 is a flowchart that illustrates exemplary steps for memory mapping a file according to an embodiment of the present invention.

FIG. 8 illustrates exemplary steps taken to memory map a file, e.g., to memory map the file 305 into the shared memory space 301. At step 802, a request is received, or a need is recognized, for mapping the file to the shared memory space 301. At step 804, a determination is made of which pages in the shared memory space 301 are currently available for storage of the file. At step 806, a reference is generated to a page which has been determined to be available for storage of the file. The reference may be generated, e.g., according to the format 501 shown in FIG. 5. At step 808, the reference is generated by logically ORing the memory address of the page with a string of control bits to be used for indicating control information related to the referenced page (e.g., whether the referenced page stored in the shared memory space 301 is modified while it is active in the shared memory space 301). The file is then stored in the page in the shared memory space 301, and the reference is stored in the page map 311. An opaque reference 401 may be generated to reference the file as discussed above by using the index of the page reference in the page map 311 and an offset of zero, as a handle to the file.

The previous discussion describes memory mapping a file which fits within the size of a single page; however, a file may be larger than a size of a single page 307 and 309, in which case portions of the file 305 may be mapped in two or more of the pages 307 and 309 of the shared memory space 301. Thus, when the need is recognized to memory map the file, a determination is made of how many pages will be needed to map the file by analyzing the size of the file to be memory mapped. If the size of the file is too large to be mapped in a single page of the shared memory space 301, and if X is the number of bytes that can be mapped in a first single page, then the first X bytes of the file are mapped in the first available page, and the remaining bytes of the file are stored similarly in successive available pages until the number of remaining unmapped bytes of the file 305 is less than the number of bytes that can be mapped in the successively next available page, at which point the remaining bytes are mapped in the successively next available page. As each page successively receives bytes from the file 305, a reference to the page is stored in the next slot of the page map 311 such that index values into the page map 311 for the references to the pages utilized for storing the portions of the file are ordered in ascending order by consecutive integer values.

Thus, when an opaque reference 401 is used to access the contents of the file 305 such as block of data 321, the "page index plus offset" value may easily be used to compute the beginning and end addresses of the information block, simply by adding the length of the information block to the beginning page index plus offset value to obtain the ending byte page index plus offset value. By byte-wise looping through the page index plus offset address values of the bytes of the information block, the memory addresses of the pages may be obtained from the page map 311, and each byte of each page may be accessed as needed. When it is desired to write to a file, a check is made to ensure that all pages to be written to are currently present in the shared memory space 301 by checking that all pages referenced by the indexes in the page map 311 between the beginning access address and the end access address are currently in the page map 311, before writing to the file.

When data stored in a particular page is accessed and modified, one or more of the tag bits of the reference 501 to the modified page in the page map 311 may be adjusted to reflect that the information in the page has been modified (or dirty), so that, at some point in time, e.g., when the referenced information is no longer needed by a session, only the modified pages need be written back to the file 305 stored in the secondary storage device 303. The references in the page map 311 and the opaque reference format 401 afford the ability to store metadata regarding the semantics of each mapping in storage elements that are easily accessed and analyzed. Also a pool of pages 307, 309, etc. can be used to memory map various files, such that when not in used, a page for another file or portion of the file can be swapped out so that data is read from the file 305 in response to receiving an opaque reference.

The previous discussion additionally referenced mapping a "file" to pages in the shared memory space 301; however, using the description above, a portion of a file may also be mapped, e.g., by using a file descriptor and an offset into the file, with a length of the portion to be mapped, to obtain a starting address in the file for mapping a portion of the file to pages in the shared memory space 301.

With this paging scheme, it is possible to share pages to serve multiple simultaneous maps of the same file as long as the shared pages of the mapped regions are aligned 0 mod PAGE_SIZE with one another. For example, if a mapping is made for a region from byte 100 to byte 6000 of a file, a first mapping may choose to map 2 pages: one from byte 100 in the file to byte 5196 (PAGE_SIZE+100), and the second from byte 5197 to byte 6000. If a second (non-private) mapping requests the region from byte 500 to byte 7000, that mapping can share the backing memory pages created by the first mapping.

CONCLUSION

While the present invention has been described in connection with a number of embodiments and implementations, the present invention is not so limited but covers various obvious modifications and equivalent arrangements, which fall within the purview of the appended claims.

What is claimed is:

1. A method of memory-mapping a block of data, the method comprising the computer-implemented steps of:
   determining that the block of data, which is stored on a non-volatile medium, is to be mapped to a shared memory space;
   identifying a page that is available in the shared memory space for storing the block of data;
   generating a page map reference for the page that includes a memory address of the page in the shared memory space;
   storing the page map reference at a location within a page map;
   storing the block of data in the page in the shared memory;
   generating an additional reference that is associated with the block of data, wherein:
      the additional reference is generated based on the location where the page map reference is stored in the page map; and
      the additional reference is not the same as any of the memory address of the page, the page map reference, and the location within the page map; and
   providing the additional reference to a process for use in accessing the block of data stored in the page in the shared memory space.

2. A method as recited in claim 1, wherein:
   a size of the block of data is larger than a capacity of the page;
   the page is a first page, the page map reference is a first page map reference, the memory address is a first memory address, and the location is a first location;
   identifying the first page that is available in the shared memory space for storing the block of data further includes the computer-implemented step of identifying the first page that is available in the shared memory space for storing a first portion of the block of data;
   storing the block of data in the first page of the shared memory further comprises the computer-implemented step of storing the first portion of the block of data in the first page of the shared memory;
   the method further comprises the computer-implemented steps of:
      identifying a second page that is available in the shared memory space for storing a second portion of the block of data, wherein the second page is discontiguous with the first page;
      generating a second page map reference for the second page based on a second memory address for the second page;
      storing the second page map reference in a second location in the page map, wherein the second location is contiguous with the first location;
      storing a second portion of the block of data in the second page of the shared memory;
   wherein the additional reference is based on the first location of where the first page map reference is stored in the page map.

3. A method as recited in claim 1, wherein generating the additional reference further comprises generating the additional reference based on an index corresponding to the location of where the page map reference is stored in the page map, an offset corresponding to a position within the block of data, and at least one control bit for controlling access to the block of data.

4. A method as recited in claim 1, wherein:
   a size of the page is power of two aligned;
   the page map reference is based on both the memory address of the page in the shared memory and at least one tag bit;
   the method further comprises the computer-implemented steps of:
      updating the at least one tag bit to indicate that the block of data has been modified; and
      based upon the at least one tag bit indicating that the block of data has been modified, causing the block of data that is stored in the page in the shared memory space to be written to the non-volatile storage medium.

5. A method as recited in claim 1, wherein:
   the block of data is a file;
   the additional reference is an opaque reference;
   the process is part of a mn-time environment that is based on a JAVA language run-time environment;
   the shared memory space is included in a database system; and
   the steps are performed by a JAVA call interface.

6. A method as recited in claim 1, wherein:
   determining that the block of data is to be mapped to the shared memory space further comprises the computer-implemented step of determining that the block of data is to be mapped to the shared memory space based on a first call;
   the first call is associated with a database session;
   providing the additional reference to the process for use in accessing the block of data stored in the page in the shared memory space further comprises the computer-implemented step of providing the additional reference in response to the first call; and
   the method further comprises the computer-implemented step of accessing the block of data stored in the page in the shared memory space based on a second call that is associated with the database session.

7. A method as recited in claim 1, further comprising the computer-implemented steps of:

receiving a call that involves performing an operation on a portion of data in the block of data stored in the page in the shared memory space, wherein the request includes the additional reference and a length value;

based on the additional reference, identifying the location within the page map;

based on the location within the page map, identifying the page map reference;

based on the page map reference, identifying the memory address of the page; and based on the memory address of the page and the length value, identifying where the portion of data in the block of data is stored in the page in the shared memory space.

8. A method as recited in claim 1, further comprising the computer-implemented steps of:

receiving a call to read the portion of data in the block of data, wherein the call includes the additional reference;

identifying the page map reference from the additional reference; determining the memory address based on the page map reference that is identified from the additional reference; and reading the portion of the block of data from the page identified by the memory address.

9. A method as recited in claim 1, further comprising the computer-implemented steps of:

receiving a call to write the portion of data in the block of data, wherein the call includes the additional reference;

identifying the page map reference from the additional reference;

determining the memory address based on the page map reference that is identified from the additional reference; and writing the portion of data in the block of data to the page identified by the memory address.

10. A computer-readable storage medium carrying one or more sequences of instructions for memory-mapping a block of data, wherein execution of the one or more sequences of instructions by one or more processors causes the one or more processors to perform the steps of:

determining that the block of data, which is stored on a non-volatile medium, is to be mapped to a shared memory space;

identifying a page that is available in the shared memory space for storing the block of data;

generating a page map reference for the page that includes a memory address of the page in the shared memory space;

storing the page map reference at a location within a page map;

storing the block of data in the page in the shared memory;

generating an additional reference that is associated with the block of data, wherein: the additional reference is generated based on the location where the page map reference is stored in the page map; and the additional reference is not the same as any of the memory address of the page, the page map reference, and the location within the page map; and providing the additional reference to a process for use in accessing the block of data stored in the page in the shared memory space.

11. A computer-readable storage medium as recited in claim 10, wherein: a size of the block of data is larger than a capacity of the page;

the page is a first page, the page map reference is a first page map reference, the memory address is a first memory address, and the location is a first location;

the instructions for identifying the first page that is available in the shared memory space for storing the block of data further comprise instructions which, when executed by the one or more processors, cause the one or more processors to perform the step of identifying the first page that is available in the shared memory space for storing a first portion of the block of data; storing the block of data in the first page of the shared memory further comprises the computer-implemented step of storing the first portion of the block of data in the first page of the shared memory;

the computer-readable storage medium further comprising instructions which, when executed by the one or more processors, cause the one or more processors to perform the steps of:

identifying a second page that is available in the shared memory space for storing a second portion of the block of data, wherein the second page is discontiguous with the first page;

generating a second page map reference for the second page based on a second memory address for the second page;

storing the second page map reference in a second location in the page map, wherein the second location is contiguous with the first location;

storing a second portion of the block of data in the second page of the shared memory;

wherein the additional reference is based on the first location of where the first page map reference is stored in the page map.

12. A computer-readable storage medium as recited in claim 10, wherein the instructions for generating the additional reference further comprise instructions which, when executed by the one or more processors, cause the one or more processors to perform the step of generating the additional reference based on an index corresponding to the location of where the page map reference is stored in the page map, an offset corresponding to a position within the block of data, and at least one control bit for controlling access to the block of data.

13. A computer-readable storage medium as recited in claim 10, wherein:

a size of the page is power of two aligned;

the page map reference is based on both the memory address of the page in the shared memory and at least one tag bit;

the computer-readable storage medium further comprising instructions which, when executed by the one or more processors, cause the one or more processors to perform the steps of:

updating the at least one tag bit to indicate that the block of data has been modified; and based upon the at least one tag bit indicating that the block of data has been modified, causing the block of data that is stored in the page in the shared memory space to be written to the non-volatile storage medium.

14. A computer-readable storage medium as recited in claim 10, wherein:

the block of data is a file; the additional reference is an opaque reference;

the process is part of a run-time environment that is based on a JAVA language run-time environment;
the shared memory space is included in a database system; and
the steps are performed by a JAVA call interface.

15. A computer-readable storage medium as recited in claim 10, wherein:
the instructions for determining that the block of data is to be mapped to the shared memory space further comprise instructions which, when executed by the one or more processors, cause the one or more processors to perform the step of determining that the block of data is to be mapped to the shared memory space based on a first call;
the first call is associated with a database session; the instructions for providing the additional reference to the process for use in accessing the block of data stored in the page in the shared memory space further comprise instructions which, when executed by the one or more processors, cause the one or more processors to perform the step of providing the additional reference in response to the first call; and
the computer-readable storage medium further comprising instructions which, when executed by the one or more processors, cause the one or more processors to perform the steps of accessing the block of data stored in the page in the shared memory space based on a second call that is associated with the database session.

16. A computer-readable storage medium as recited in claim 10, further comprising instructions which, when executed by the one or more processors, cause the one or more processors to perform the steps of:
receiving a call that involves performing an operation on a portion of data in the block of data stored in the page in the shared memory space, wherein the request includes the additional reference and a length value;
based on the additional reference, identifying the location within the page map;
based on the location within the page map, identifying the page map reference;
based on the page map reference, identifying the memory address of the page; and
based on the memory address of the page and the length value, identifying where the portion of data in the block of data is stored in the page in the shared memory space.

17. A computer-readable storage medium as recited in claim 10, further comprising instructions which, when executed by the one or more processors, cause the one or more processors to perform the steps of:
receiving a call to read the portion of data in the block of data, wherein the call includes the additional reference;
identifying the page map reference from the additional reference;
determining the memory address based on the page map reference that is identified from the additional reference; and
reading the portion of the block of data from the page identified by the memory address.

18. A computer-readable storage medium as recited in claim 10 further comprising instructions which, when executed by the one or more processors, cause the one or more processors to perform the steps of:
receiving a call to write the portion of data in the block of data, wherein the call includes the additional reference;
identifying the page map reference from the additional reference;
determining the memory address based on the page map reference that is identified from the additional reference; and
writing the portion of data in the block of data to the page identified by the memory address.

19. An apparatus for memory-mapping a block of data, comprising:
means for determining that the block of data, which is stored on a non-volatile medium, is to be mapped to a shared memory space;
means for identifying a page that is available in the shared memory space for storing the block of data;
means for generating a page map reference for the page that includes a memory address of the page in the shared memory space;
means for storing the page map reference at a location within a page map;
means for storing the block of data in the page in the shared memory;
means for generating an additional reference that is associated with the block of data, wherein:
the additional reference is generated based on the location where the page map reference is stored in the page map; and
the additional reference is not the same as any of the memory address of the page, the page map reference, and the location within the page map; and
means for providing the additional reference to a process for use in accessing the block of data stored in the page in the shared memory space.

20. An apparatus as recited in claim 19, wherein:
a size of the block of data is larger than a capacity of the page;
the page is a first page, the page map reference is a first page map reference, the memory address is a first memory address, and the location is a first location;
the means for identifying the first page that is available in the shared memory space for storing the block of data further includes means for identifying the first page that is available in the shared memory space for storing a first portion of the block of data;
the means for storing the block of data in the first page of the shared memory further comprises the computer-implemented step of storing the first portion of the block of data in the first page of the shared memory;
the apparatus further comprises:
means for identifying a second page that is available in the shared memory space for storing a second portion of the block of data, wherein the second page is discontiguous with the first page;
means for generating a second page map reference for the second page based on a second memory address for the second page;
means for storing the second page map reference in a second location in the page map, wherein the second location is contiguous with the first location;
means for storing a second portion of the block of data in the second page of the shared memory;
wherein the additional reference is based on the first location of where the first page map reference is stored in the page map.

21. An apparatus as recited in claim 19, wherein the means for generating the additional reference further comprises means for generating the additional reference based on an index corresponding to the location of where the page map reference is stored in the page map, an offset corresponding to a position within the block of data, and at least one control bit for controlling access to the block of data.

22. An apparatus as recited in claim 19, wherein:

a size of the page is power of two aligned;

the page map reference is based on both the memory address of the page in the shared memory and at least one tag bit;

the apparatus further comprises:

means for updating the at least one tag bit to indicate that the block of data has been modified; and means for causing, based upon the at least one tag bit indicating that the block of data has been modified, the block of data that is stored in the page in the shared memory space to be written to the non-volatile storage medium.

23. An apparatus as recited in claim 19, wherein:

the block of data is a file;

the additional reference is an opaque reference;

the process is part of a run-time environment that is based on a JAVA language run-time environment;

the shared memory space is included in a database system; and the apparatus includes a JAVA call interface.

24. An apparatus as recited in claim 19, wherein:

the means for determining that the block of data is to be mapped to the shared memory space further comprises means for determining that the block of data is to be mapped to the shared memory space based on a first call;

the first call is associated with a database session;

the means for providing the additional reference to the process for use in accessing the block of data stored in the page in the shared memory space further comprises means for providing the additional reference in response to the first call; and the apparatus further comprises means for accessing the block of data stored in the page in the shared memory space based on a second call that is associated with the database session.

25. An apparatus as recited in claim 19, further comprising:

means for receiving a call that involves performing an operation on a portion of data in the block of data stored in the page in the shared memory space, wherein the request includes the additional reference and a length value;

means for identifying, based on the additional reference, the location within the page map;

means for identifying, based on the location within the page map, the page map reference;

means for identifying, based on the page map reference, the memory address of the page; and means for identifying, based on the memory address of the page and the length value, where the portion of data in the block of data is stored in the page in the shared memory space.

26. An apparatus as recited in claim 19, further comprising:

means for receiving a call to read the portion of data in the block of data, wherein the call includes the additional reference;

means for identifying the page map reference from the additional reference;

means for determining the memory address based on the page map reference that is identified from the additional reference; and means for reading the portion of the block of data from the page identified by the memory address.

27. An apparatus as recited in claim 19, further comprising:

means for receiving a call to write the portion of data in the block of data, wherein the call includes the additional reference;

means for identifying the page map reference from the additional reference;

means for determining the memory address based on the page map reference that is identified from the additional reference; and means for writing the portion of data in the block of data to the page identified by the memory address.

* * * * *

UNITED STATES PATENT AND TRADEMARK OFFICE
CERTIFICATE OF CORRECTION

PATENT NO. : 7,383,414 B2
APPLICATION NO. : 10/856681
DATED : June 3, 2008
INVENTOR(S) : Lee et al.

Page 1 of 1

It is certified that error appears in the above-identified patent and that said Letters Patent is hereby corrected as shown below:

In column 1, line 27, delete "map( )," and insert -- mmap(), --, therefor.

In column 1, line 31, delete "map( )" and insert -- mmap() --, therefor.

In column 2, line 8, delete "reference" and insert -- references --, therefor.

In column 2, line 9, after "simulating" insert -- a --.

In column 3, line 1, before "DESCRIPTION" insert -- BRIEF --.

In column 5, line 29, before "media" insert -- storage --.

In column 5, line 36, after "other" insert -- similar --.

In column 9, line 20, delete "317" and insert -- 307 --, therefor.

In column 10, line 48–49, delete "page map" and insert -- page_map --, therefor.

In column 11, line 19, delete "requester," and insert -- requestor, --, therefor.

In column 14, line 49, in claim 5, delete "mn-time" and insert -- run-time --, therefor.

Signed and Sealed this

Seventh Day of July, 2009

JOHN DOLL
*Acting Director of the United States Patent and Trademark Office*